United States Patent Office 3,546,313
Patented Dec. 8, 1970

3,546,313
CONVERSION OF OLEFINS
Robert L. Banks, Bartlesville, Okla., assignor to Phillips Petroleum Company, a corporation of Delaware
No Drawing. Filed Apr. 3, 1967, Ser. No. 627,629
Int. Cl. C07c *3/00*
U.S. Cl. 260—683                          11 Claims

ABSTRACT OF THE DISCLOSURE

Olefins are converted into other olefins having different numbers by contact with magnesium oxide which has been rendered active for disproportionating propylene into ethylene and butene by treatment with hydrogen or carbon monoxide at elevated temperature.

---

This invention relates to the olefin reaction for conversion of olefin hydrocarbons into other hydrocarbons. In one aspect, it relates to a method for rendering a solid catalytic material active for the olefin reaction. In another aspect, it relates to a catalyst that is active for disproportionating propylene into ethylene and butene.

The olefin reaction is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyenes; for example, the conversion of ethylene and 4-methylpentene-2 yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

Magnesium oxide has shown little activity for the olefin reaction either as a catalyst per se or as a support for promoting compounds such as oxides of molybdenum, tungsten, rhenium, and the like. I have now found, however, that magnesium oxide, often referred to as "magnesia," can be rendered active for the olefin reaction by treatment with carbon monoxide or hydrogen at elevated temperatures in the range of about 500 to 1200° F. for about 0.1 to 4 hours after the catalyst has been prepared and calcined in the presence of an oxygen-containing gas such as air.

It is an object of this invention to provide a catalyst for the conversion of olefin hydrocarbons by the olefin reaction process. It is also an object of this invention to provide a method for rendering magnesium oxide active for the olefin reaction process. Other aspects, objects, and advantages of this invention will be apparent to one skilled in the art upon studying the disclosure including the detailed description of the invention.

The magnesia applicable for use in this invention can be any conventional catalytic grade or activated magnesium oxide prepared by any conventional technique. Thus, it can be prepared synthetically or derived from a naturally occurring mineral such as Brucite. It can range in form from a fine powder to coarse granules. The finished catalyst, after calcination and treatment with the treating gas, can also be in the form of powder or granules as well as in other shapes such as agglomerates, pellets, spheres, extrudates, beads, and the like, depending upon the type of contacting technique which utilizes the catalyst. The magnesia should have a surface area of at least about 100 square meters per gram.

Suitable promoters for the magnesia include an oxide of molybdenum, tungsten, rhenium or tellurium: molybdenum hexacarbonyl or tungsten hexacarbonyl; or combinations of these. The amount of promoter in the finished catalyst will generally be an amount ranging up to and including 30 weight percent, preferably 3 to about 15 weight percent, of the total catalyst composite.

The promoted catalyst compositions can be prepared by conventional techniques. For example, molybdenum oxide can be coprecipitated with magnesium hydroxide followed by calcination in air at temperatures of 700 to 1600° F. for about 0.1 to 30 hours. Magnesium oxide can be impregnated with rhenium oxide in an aqueous solution and the resulting impregnated material can then be similarly dried and calcined. Molybdenum hexacarbonyl can be impregnated, using a non-aqueous solvent such as benzene, onto magnesia which has previously been activated by calcination in air. Solvent is removed by drying at about 600° F. in an inert atmosphere. In a presently preferred embodiment, a solution of a tungsten compound such as ammonium metatungstate is used to impregnate magnesia and the resulting composite is then calcined in an oxygen-containing stream. It is necessary, of course, to pretreat these catalyst preparations, before use, with a treating gas such as carbon monoxide, hydrogen or a hydrocarbon.

The freshly prepared catalyst, i.e., the magnesium oxide or the magnesium oxide-promoter composite, is calcined in the presence of an oxygen-containing gas, such as flowing air, for about 1 to 30 hours at a temperature of about 500 to 1100° F. After the calcination the catalyst is then treated with the treating gas at a temperature of about 500 to 1200° F., preferably 800 to 1100° F., for about .1 to 4 hours, preferably about 0.5 to 2 hours and at any convenient pressure, but preferably in the range of 0–100 p.s.i.g. The catalyst can then be flushed with nitrogen while being cooled to reaction temperature if the desired reaction temperature is lower than the treating temperature. To regenerate a spent catalyst, the air activation and the treament with the suitable treating gas are essentially repeated.

It should be noted that when the magnesia is associated with one or more of the above-mentioned promoters and is given the conventional activation treatment and the treatment of carbon monoxide or hydrogen, the finished catalyst composition may contain species whose identity is not completely understood. Therefore, it should be understood that the catalytic agent is the reaction product resulting from the admixture of these preparative materials and treated wtih the treating gas.

Olefins applicable for use in the process of the invention are acyclic mono- and polyenes having at least 3 carbon atoms per molecule including cycloalkyl and aryl derivatives thereof; cyclic mono- and polyenes having at least 4 carbon atoms per molecule including alkyl and aryl derivatives thereof; mixtures of the above olefins; and mixtures of ethylene and the above olefins. Many useful reactions are accomplished with such cyclic olefins having 3–30 carbon atoms per molecule and with such cyclic olefins having 4–30 carbon atoms per molecule.

Some specific examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene, 2,5-octadiene, 2,4,6-octatriene, 2-nonene, 1-dodecene, 2-tetradecene, 1-hexadecene, 5,6-dimethyl-2,4-octadiene, 2-methyl - 1 - butene, 2-methyl-2-butene, 1,3-dodecadiene, 1,3,6-dodecatriene, 3-methyl-1-butene, 1-phenylbutene-2, 7,7 - diethyl-1,3,5-decatriene, 1,3,5,7,9-octadecapentaene, 1,3-eicosadiene, 4-octene, 3-eicosene and 3-heptene, and the like and mixtures thereof.

Some specific examples of cyclic olefins suitable for the reactions of this invention are cyclobutene, cyclopentene, cyclohexene, 3-methylcyclopentene, 4-ethylcyclohexene, 4-benzylcyclohexene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4.7,10-cyclododecatetraene 2-methyl-6-ethylcyclooctadiene-1,4, and the like and mixtures thereof.

The olefin reaction process using the catalyst of this invention can be carried out either batchwise or continuously, using a fixed catalyst bed, a stirred batch reactor, a fluidized catalyst chamber, or other conventional contacting techniques. The process can be carried out in the vapor or liquid phase at temperatures from about 600 to 1200°, preferably about 800 to 1000° F., at pressures of 0 to about 200 p.s.i.g. or even higher. In continuous operations, weight hourly space velocities of 0.1 to about 500 can be utilized. In batch reactions, the catalyst comprising from about 1 to 40 weight percent of the reaction mixture and reaction times of about 1 minute to 20 hours can be utilized. If desired, paraffinic and cycloparaffinic hydrocarbons up to about 12 carbon atoms per molecule can be employed as diluents for the reaction. Specific examples of suitable diluents include propane, cyclohexane, methylcyclohexane, normal pentane, normal hexane, isooctane, dodecane and the like, or mixtures thereof. Other diluents can be used provided the diluent is nonreactive under the conditions of olefinic reaction process.

At the end of the reaction period, conventional methods can be used to separate the hydrocarbon phase from the solid catalyst phase and to recover the products. Techniques such as fractionation, solvent extraction, absorption, and the like, can be employed for the separation and isolation of products. Unconverted feed materials, diluents, or their products not in the desired molecular weight range can be recycled.

The following specific embodiments of the invention will be helpful in attaining an understanding of the invention but should be considered as exemplary of the invention and should not be construed as unduly limiting the invention.

EXAMPLE I

Finely powdered magnesium oxide was wetted to form a cake which was then crushed, pressed into tablets and recrushed to form 20–40 mesh granules. The surface area of this material was 167 m.$^2$/g., the pore volume was 1.07 cc./g. and the pore diameter was 257 angstroms.

A sample of the material was calcined in flowing air at 1100° F. for 1 hour and then treated with carbon monoxide for 30 minutes at the same temperature after which it was flushed with nitrogen and maintained in a nitrogen atmosphere until used.

The sample of calcined, CO-treated catalyst was placed in a tubular, stainless steel reactor as a fixed bed of catalyst and propylene was passed through the reactor under the conditions shown in the following Table I.

TABLE I.—PROPYLENE DISPROPORTIONATION

| | | |
|---|---|---|
| WHSV (weight hourly space velocity) | 70 | 15 |
| Temp., ° F | 790 | 815 |
| Pressure, p.s.i.g | 300 | 300 |
| Effluent, wt. percent: | | |
| Ethylene | 0.45 | 0.53 |
| Propane [1] | 0.42 | 0.43 |
| Propylene | 98.24 | 98.03 |
| 1-butene | 0.22 | 0.26 |
| Trans-2-butene | 0.40 | 0.44 |
| Cis-2-butene | 0.27 | 0.31 |
| Conversion, percent | 1.30 | 1.50 |

[1] Originally present in feed.

The data in the above table show that propylene was disproportionated to ethylene and butenes.

EXAMPLE II

Using the same catalyst as in Example I, 2-butene was disproportionated in a similar continuous manner. The essential data and results are shown in the following Table II.

TABLE II 2-butene disproportionation

| | |
|---|---|
| WHSV | 30 |
| Temp. ° F. | 800 |
| Pressure, p.s.i.g. | 300 |

TABLE II—Continued

Effluent, wt. percent:
- Ethylene _____ 0.1
- Propylene _____ 2.9
- n-Butene+neopentane _____ 1.0
- 1-butene+isobutylene _____ 22.8
- Trans-2-butene _____ 40.9
- Cis-2-butene _____ 27.9
- n-Pentane and/or butadiene _____ 0.1
- 1-pentene _____ 0.2
- Trans-2-pentene _____ 2.2
- Cis-2-pentene _____ 1.2
- $C_6+$ _____ 0.7

Conversion, percent _____ 7.4

The data of Table II show that 2-butene was disproportionated to other olefins of both higher and lower number of carbon atoms. In another run at the same conditions with a sample of the magnesium oxide catalyst that was not treated with CO the conversion of 2-butene was only 0.3 weight percent.

EXAMPLE III

A sample of the 20–40 mesh magnesium oxide of Example I was wetted with an aqueous solution of ammonium metatungstate. The resulting composition was dried and calcined in a stream of dry air for 3 hours at 1100° F. in a stainless steel tubular reactor. The catalyst was flushed with nitrogen and treated with a flowing stream of carbon monoxide at 1100° F. for 30 minutes. The finished catalyst contained about 5.6 weight percent tungsten calculated as the oxide.

Propylene was disproportionated over the above catalyst at the conditions shown in the following Table III. Runs were also made with the catalyst after regeneration but with no CO treatment.

TABLE III.—PROPYLENE DISPROPORTIONATION

| Run No. | 1 | 2 | 3 | 4 | 5 |
|---|---|---|---|---|---|
| Catalyst treatment | CO | | None | | |
| WHSV | 70 | 15 | 70 | 15 | 15 |
| Temp. ° F | 815 | 820 | 800 | 805 | 810 |
| Pressure, p.s.i.g | 300 | 300 | 300 | 300 | 300 |
| Effluent analysis, wt. percent: | | | | | |
| Ethylene | 4.1 | 8.0 | (¹) | 0.1 | 0.1 |
| Propane ² | 0.4 | 0.4 | 0.4 | 0.4 | 0.4 |
| Propylene | 90.2 | 79.7 | 99.6 | 98.6 | 98.8 |
| 1-butene | 1.1 | 2.6 | (¹) | 0.1 | 0.1 |
| Trans-2-butene | 2.4 | 5.1 | (¹) | 0.4 | 0.3 |
| Cis-2-butene | 1.7 | 3.6 | (¹) | 0.4 | 0.3 |
| $C_5+$ | 0.1 | 0.6 | (¹) | (¹) | (¹) |
| Conversion, percent | 9.4 | 19.9 | 0.0 | 1.0 | 0.8 |

¹ Trace.
² Originally in feed.

The data of Table III show that the CO treatment is necessary in order to obtain substantial disproportionation of propylene.

When the non-treated catalyst of runs 3, 4 and 5 was regenerated with air and then again treated with CO it was found to be again active for propylene disproportionation and the results of runs 1 and 2 were essentially reproduced.

That which is claimed is:

1. A process for converting an olefin in the olefin reaction which comprises contacting at least one olefin hydrocarbon selected from the group consisting of acyclic mono- and polyenes having 3 to 30 carbon atoms per molecule, cyclic mono- and polyenes having 4 to 30 carbon atoms per molecule, and mixtures of at least one such olefin with ethylene, with a catalyst selected from the group consisting of a catalyst consisting essentially of magnesium oxide and a catalyst consisting essentially of magnesium oxide promoted with at least one promoter selected from the group consisting of hexacarbonyls of tungsten and molybdenum and oxides of tungsten, molybdenum, rhenium and tellurium, said catalyst having been treated prior to contact with said olefin with a treating gas selected from the group consisting of carbon monoxide and hydrogen at a temperature of about 500 to 1200° F. for a period of about 0.1 to 4 hours, under conditions including conditions of temperature in the range of about 600 to 1200° F., pressure and contact time suitable for producing products of the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, said catalyst being the sole olefin reaction catalyst in said conversion zone.

2. The process of claim 1 wherein the olefin reaction conversion is conducted at a pressure in the range of about 0 to 2000 p.s.i.g. at a space velocity of about 0.1 to 500 parts by weight of feed per part by weight of catalyst per hour.

3. The process of claim 1 wherein the catalyst consists essentially of magnesium oxide and the treating gas is carbon monoxide.

4. The process of claim 1 wherein the olefin reaction is disproportionation and the olefin hydrocarbon is propylene.

5. The process of claim 1 wherein the catalyst comprises a base consisting essentially of magnesium oxide.

6. The process of claim 5 wherein said base is promoted with a hexacarbonyl of tungsten or molybdenum or an oxide of tungsten, molybdenum, rhenium or tellurium.

7. The process of claim 6 wherein the catalyst consists essentially of magnesium oxide promoted with tungsten oxide and the treating gas is carbon monoxide.

8. The process of claim 5 wherein the olefin reaction is disproportionation and the olefin hydrocarbon is propylene 9. The process of claim 6 wherein the catalyst consists essentially of magnesium oxide promoted with tungsten oxide, the treating gas is carbon monoxide, the olefin reaction is disproportionation, and the olefin hydrocarbon is propylene.

10. The process of claim 3 wherein an acyclic monoolefin hydrocarbon is disproportionated.

11. The process of claim 7 wherein an acyclic monoolefin hydrocarbon is disproportionated.

References Cited

UNITED STATES PATENTS

| 2,361,613 | 10/1944 | Drennan | 260—683.2 |
| 3,418,390 | 12/1968 | Heckelsberg | 260—683 |
| 3,424,812 | 1/1969 | Howman | 260—666A |
| 3,261,879 | 7/1966 | Banks | 260—683 |

OTHER REFERENCES

Chemical Abstracts, vol. 68; 2145zt, A. L. Lapidus et al., Izv. Akad. Nauk S.S.S.R. Ser. Khim. 1967 (J). 1016-23.

DELBERT E. GANTZ, Primary Examiner

V. O'KEEFE, Assistant Examiner

U.S. Cl. X.R.

260—666, 677